Patented Sept. 28, 1943

2,330,380

UNITED STATES PATENT OFFICE 2,330,380

PROCESS OF MAKING PYRIMIDINE COMPOUNDS

Donald Price, New York, N. Y., Everette L. May, Newark, N. J., and Frank D. Pickel, Bellmore, N. Y., assignors to National Oil Products Company, Harrison, N. J., a corporation of New Jersey No Drawing. Application December 20, 1939, Serial No. 310,162

3 Claims. (Cl. 260—251)

This invention relates to the esterification of pyrimidine carboxylic acids and particularly to such an esterification which may be employed as a step in the production of pyrimidine compounds which may be reacted with suitable thiazole compounds to form vitamin $B_1$ or analogues thereof.

Vitamin $B_1$, which is also known as the antineuritic vitamin, is contained in a large number of naturally occurring food products and is believed to be essential for promoting the growth and maintaining the health of human beings; it has also been found to be useful in the treatment of certain diseases, e. g. beri-beri. The structure of vitamin $B_1$ has been determined and it has been found that this vitamin may be synthesized by condensing 2-methyl 5-bromomethyl 6-amino pyrimidine hydrobromide with 4-methyl 5-$\beta$-hydroxyethyl thiazole and treating the reaction product with alcoholic silver chloride. A large number of methods for preparing the pyrimidine bromide employed in this synthesis have been proposed; one of the most convenient ways of obtaining this compound is to brominate the corresponding pyrimidine alcohol. While several methods for preparing the pyrimidine alcohol have been suggested, these methods involve steps in which varying amounts of undesirable by-products are formed; hence the problem of synthesizing this pyrimidine alcohol has not as yet been satisfactorily solved.

It is an object of this invention to provide a new method for esterifying pyrimidine carboxylic acids.

Another object is to make the pyrimidine carboxylic acids available for the synthesis of pyrimidine compounds such as vitamin $B_1$ and its analogues.

We have discovered by this invention that pyrimidine carboxylic acids containing a carboxylic acid group at the 5 position may readily be esterified by dissolving the acid in concentrated sulfuric acid, adding to the solution an aliphatic alcohol containing from 1-6 carbon atoms and heating the reaction mixture. As is well known the positions in the pyrimidine nucleus are numbered as follows:

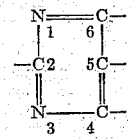

and derivatives thereof carrying a carboxylic acid group at the 5 position are highly resistant to the usual methods of esterification. The esters prepared in accordance with this invention are very useful as starting materials for the synthesis of other pyrimidine compounds, for instance, the corresponding pyrimidine aldehydes which may be employed as raw materials in the synthesis of vitamin $B_1$. Such pyrimidine aldehydes may be very advantageously manufactured from the corresponding pyrimidine carboxylic acids by a process involving forming an ester of the carboxylic acid in accordance with the process of this invention, and thereafter, treating the ester with hydrazine to form the hydrazide, reacting the hydrazide thus obtained with an aromatic sulfonyl halide in order to form the pyrimidine sulfonhydrazide and finally subjecting the sulfonhydrazide to the action of an alkaline substance. For instance, such a procedure may be employed for the preparation of 2-methyl 5-formyl 6-amino pyrimidine

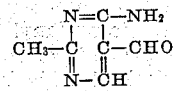

This aldehyde may be reduced to form 2-methyl 5-hydroxymethyl 6-amino pyrimidine, which compound may be brominated and reacted with 4-methyl 5-$\beta$-hydroxyethyl thiazole to yield vitamin $B_1$ bromide hydrobromide.

The pyrimidine carboxylic acids employed as starting materials in the esterification process of this invention may be obtained in a variety of manners; thus, for example, acetamidine may be condensed with ethoxymethylene malonodinitrile and the pyrimidine nitrile thus obtained hydrolyzed to give the desired acid. It will thus be seen that the process of this invention makes use of pyrimidine carboxylic acids which may be cheaply produced from cheaply and readily procurable raw materials, thus making these raw materials available for the synthesis of valuable pyrimidine compounds such as vitamin $B_1$ and its analogues.

The esterification step of this invention may satisfactorily be carried out by dissolving the carboxylic acid in three to four times its weight of concentrated sulfuric acid, adding an amount of an alcohol to the solution slightly in excess of that required to react with the acid and then agitating the reaction mixture at a temperature between about 90° C. and about 100° C. for one-half hour or more. The alcohol employed to esterify the carboxylic acid may be any of the aliphatic alcohols containing from 1 to 6 carbon atoms; we have found that methyl alcohol is particularly suitable for use in this connection. The ester may be recovered from the sulfuric acid solution by pouring the mass over ice, adding an alkali to the aqueous mass until it becomes slightly alkaline, filtering to recover most of the ester and extracting the remaining ester from the filtrate with a solvent such as ether.

The above method of esterification has been found to be particularly suitable for preparing esters of pyrimidine carboxylic acids having the carboxyl group at the 5 position and an amino group at the 6 position. Such carboxylic acids strongly resist normal methods of esterification; thus, for example, attempts to esterify these acids by treatment with methanol and hydrochloric acid, or with methanol and a mixture of hydrochloric acid and sulfuric acid, or with methanol in the presence of p-toluene sulfonic acid have not yielded any appreciable amounts of the desired esters. Yet we found that by operating in accordance with the above method of esterification excellent yields of the desired esters may be easily obtained.

As set forth hereinabove the pyrimidine ester prepared as above described may be utilized as a starting material for the preparation of vitamin B1 and its analogues. For instance, the ester may be treated with hydrazine in order to form a hydrazide having the formula

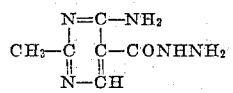

Preferably the ester is dissolved in ethyl alcohol, hydrazine hydrate and water added thereto and the mixture refluxed. The desired hydrazide separates from the reaction mass upon cooling and may be recovered by filtration. Other methods of preparing hydrazides known to the art may also be used.

The hydrazide thus obtained may then be reacted with an aromatic sulfonyl halide, such as benzene sulfonyl chloride, in order to convert the hydrazide to a sulfonhydrazide having the formula

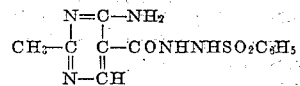

This reaction may also be carried out under a variety of conditions; for example, the hydrazide may be dissolved or suspended in a solvent such as pyridine, and benzene sulfonyl chloride may then be gradually added to the solution. Upon cooling, the sulfonhydrazide crystallizes and may be filtered and dried in the usual manner.

The final step in the preferred synthesis of the aldehydes involves treating the sulfonhydrazide prepared as above described with an alkaline substance such as sodium or potassium carbonate, whereby 2-methyl 5-formyl 6-amino pyrimidine is produced. This reaction may be carried out by dissolving the sulfonhydrazide in a solvent therefor, such as ethylene glycol, heating the solution to elevated temperatures and then adding anhydrous sodium carbonate. The addition of sodium carbonate causes a brisk evolution of gas and after this evolution has ceased, the reaction mixture may be diluted with water, cooled, saturated with sodium carbonate and the aldehyde extracted from this mixture with a solvent therefor such as ethyl acetate or chloroform.

The 2-methyl 5-formyl 6-amino pyrimidine prepared as just described may be easily reduced to 2-methyl 5-hydroxymethyl 6-amino pyrimidine. We prefer to carry out this reduction by treating the aldehyde with hydrogen in the presence of a catalyst such as platinum oxide. However, other known methods for reducing aldehydes to alcohols may also be employed; for example, the aldehyde may be subjected to reduction with sodium amalgam. The pyrimidine alcohol may be brominated and then treated with 4-methyl 5-β-hydroxyethyl thiazole in order to produce vitamin B1 bromide hydrobromide. Furthermore, analogues of vitamin B1 which may be readily converted to vitamin B1 may be prepared by reacting the brompyrimidine derivative with either 4-methyl 5-β-aminoethyl thiazole or 4-methyl 5-cyanomethyl thiazole as described in our copending application Serial No. 310,161, filed December 20, 1939. The aldehydes may also be employed as starting materials or intermediates in other chemical operations.

The following example is illustrative of our invention; amounts are given in parts by weight.

25 parts of 2-methyl 5-cyano 6-amino pyrimidine were refluxed with 270 parts of 10% potassium hydroxide for about 2¼ hours. At the end of this time the solution was cooled and made acidic by the addition of acetic acid. A precipitate formed upon acidification which proved to be 2-methyl 5-carboxy 6-amino pyrimidine containing 1 mol of water of crystallization.

25 parts of 2-methyl 5-carboxy 6-amino pyrimidine were dissolved in 80 parts of concentrated sulfuric acid with agitation. 20 parts of methyl alcohol were then added to the solution and the reaction mixture heated on a steam bath for 2½ hours with agitation, 8 additional parts of methyl alcohol being added to the solution every three-quarters of an hour. The solution was then poured over ice, and solid sodium carbonate was added to the aqueous mass until it became alkaline. At this point a precipitate formed and was filtered off. The filtrate was extracted with ether and the ether extract evaporated to dryness. The residue from the evaporation was combined with the precipitate obtained as above described. The mixture was then recrystallized from water whereby a compound having a melting point between 184° C. and 185° C. was obtained. This product on analysis proved to be the methyl ester of 2-methyl 5-carboxy 6-amino pyrimidine.

5 parts of this ester were dissolved in 8 parts of ethyl alcohol and 4 parts of 85% hydrazine hydrate and 4 parts of water were added to the solution. The mixture was then refluxed for 1½ hours. Upon cooling, a compound separated having a melting point between 218° C. and 219° C.; this product was the crude hydrazide of 2-methyl 5-carboxy 6-amino pyrimidine. Recrystallization of this product from 95% ethanol yielded the pure hydrazide which had a melting point between 220° C. and 221° C.

5 parts of the hydrazide were suspended in 100 parts of dry pyridine and 5.5 parts of benzene sulfonyl chloride were gradually added to the suspension. A gradual solution of the hydrazide occurred together with the simultaneous precipitation of a solid, which was probably pyridine hydrochloride. The solution was agitated for 3½ hours, at the end of which time the pyridine was evaporated from the solution and water added to the residue. The addition of water to the residue caused the formation of crystals which were filtered off and dried. These crystals had a melting point between 228° C. and 229° C. and proved to be the sulfonhydrazide of 2-methyl 5-carboxy 6-amino pyrimidine.

10 parts of sulfonhydrazide prepared as above described were then dissolved in 130 parts of ethylene glycol, the solution was heated to 160° C. and 9 parts of anhydrous sodium carbonate were added thereto. There was a brisk evolution of gas which ceased after 2 to 3 minutes. The solution was then permitted to cool slightly, diluted with hot water and saturated with sodium carbonate. The saturated solution was extracted with chloroform, the extract evaporated to dryness, and the solid residue crystallized from 95% ethyl alcohol. The crystallized material had a melting point between 194.5° C. and 196° C. and upon analysis proved to be 2-methyl 5-formyl 6-amino pyrimidine.

3 parts of the aldehyde prepared as above described were suspended in 160 parts of 95% ethanol, 0.2 part of platinum oxide catalyst was added thereto and the mixture shaken in an atmosphere of hydrogen at atmospheric pressure for about 2 hours. At the end of this time the catalyst was filtered from the solution, the solvent evaporated and the residue crystallized from isopropanol. A product was obtained having a melting point between 193° C. and 194° C. which proved to be 2-methyl 5-hydroxymethyl 6-amino pyrimidine.

It will be evident from the above description that our invention provides a new method of esterifying pyrimidine carboxylic acids whereby to render them available for the synthesis of valuable pyrimidine aldehydes, hydrazides, sulfonhydrazides and other derivatives such as vitamin $B_1$. Our invention is particularly valuable in that it provides a practical method for preparing pyrimidine compounds which may be reacted with thiazole derivatives to produce substances which may be converted to vitamin $B_1$. Our invention will, therefore, be of great interest to those engaged in the production of synthetic vitamins.

Since certain changes in carrying out the above process and certain modifications in the products which embody the invention may be made without departing from its scope, it is intended that all matter contained in the above description shall be interpreted as illustrative and not in a limiting sense.

Having described our invention, what we claim as new and desire to secure by Letters Patent, is:

1. A process for preparing esters of pyrimidine compounds having a carboxyl group in the 5 position which comprises dissolving a pyrimidine carboxylic acid of the above type in concentrated sulfuric acid, adding to the solution an aliphatic alcohol containing from 1 to 6 carbon atoms and heating the reaction mixture.

2. A process for preparing esters of pyrimidine compounds having a carboxyl group at the 5 position and an amino group at the 6 position of the pyrimidine nucleus, which comprises dissolving an amino pyrimidine carboxylic acid of the above type in concentrated sulfuric acid, adding to the solution an aliphatic alcohol having from 1 to 6 carbon atoms and heating the reaction mixture.

3. A process for preparing esters of 2-methyl 5-carboxy 6-amino pyrimidine which comprises dissolving said carboxylic acid in from about three to about four times its weight of concentrated sulfuric acid, adding methyl alcohol to the solution and heating the reaction mixture at a temperature between about 90° and about 100° C.

DONALD PRICE.
EVERETTE L. MAY.
FRANK D. PICKEL.